Feb. 14, 1950  J. W. LEIGHTON  2,497,459

WHEEL SUSPENSION

Filed July 30, 1945  2 Sheets-Sheet 1

INVENTOR.
John W. Leighton.
BY
Harness, Dickey & Pierce.
ATTORNEYS.

Feb. 14, 1950  J. W. LEIGHTON  2,497,459
WHEEL SUSPENSION
Filed July 30, 1945  2 Sheets-Sheet 2
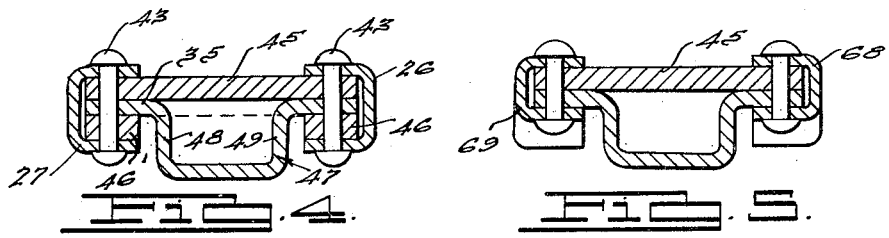
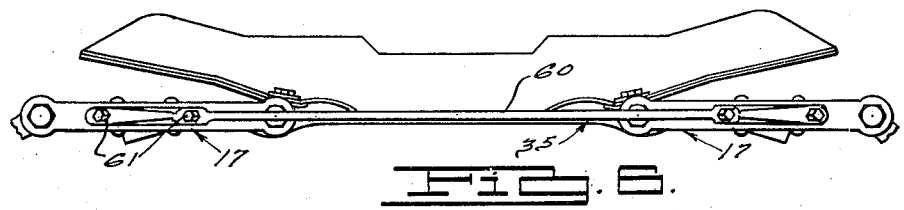
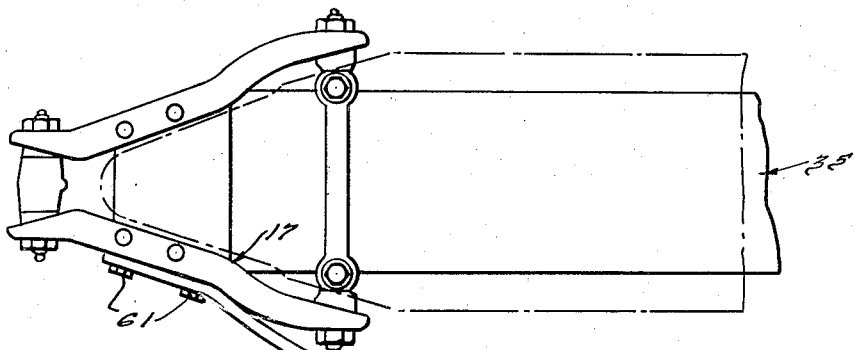
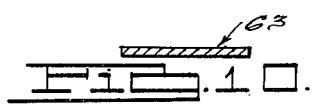
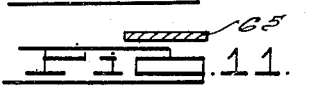
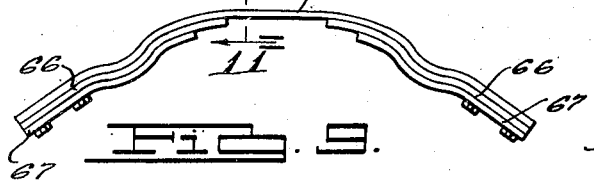
INVENTOR.
John W. Leighton
BY
Harness, Dickey & Pierce
ATTORNEYS.

Patented Feb. 14, 1950

2,497,459

UNITED STATES PATENT OFFICE 2,497,459

WHEEL SUSPENSION

John W. Leighton, Port Huron, Mich.

Application July 30, 1945, Serial No. 607,765

10 Claims. (Cl. 267—11)

This invention relates generally to automobiles and it has particular relation to wheel suspensions for mounting the frame on the wheels.

In some respects the present invention relates to those inventions embodied in my copending applications for patent, Serial Number 566,869, filed December 6, 1944, and Serial Number 598,122, filed June 7, 1945. In those inventions conventional type coil springs are provided between the frame of the vehicle and control arms pivoted on the frame and connected to the wheels, and such coil springs resiliently support substantially the entire load of the frame and the vehicle body. Also in those inventions, an antisway device is provided which comprises a resilient bar extending transversely of the frame and connected at its ends respectively to the opposite lower arms of the wheel suspensions. This bar is independent of the frame and particularly in the event the frame tends to roll, the bar strongly acts to resist such movement of the frame. Additionally, the resilient bar enables using softer coil springs and a more comfortable ride may be obtained without sacrificing stability.

Briefly, according to the present invention, the coil springs heretofore employed are eliminated and in place of the coil springs, a resilient spring element is provided which extends transversely of the frame and directly connects the suspensions. This spring element may, for instance, comprise a relatively wide strip of resilient steel extending transversely of the frame and having its ends rigidly connected to the arms of the suspensions. Any movement of either arm or any movement of the frame relative to the arms must flex this spring element and consequently spring resistance is set up. Resiliently supporting the frame on the arms of the suspensions in this manner simplifies the construction of the frame, provides more rigidity for the front end of the vehicle, provides additional space or room normally occupied by parts required where coil springs are used, and results in a cost saving.

One object of the present invention is, therefore, to provide a simplified type of individual wheel suspension which will be less expensive to manufacture and assemble and which will improve the riding characteristics of the vehicle.

Another object of the invention is to provide an improved type of wheel suspension for vehicles which will enable elimination of the conventional coil springs and the usually large and costly spring seats on the arms and frame.

Another object of the present invention is to provide an improved type of suspension, as mentioned, which operates to prevent sway or roll of the frame.

Other objects of the invention will become apparent from the following specifications, from the drawings relating thereto, and from the claims hereinafter set forth.

For a better understanding of the invention reference may be had to the drawings wherein:

Figure 4 is a cross-sectional view taken substantially along the line 4—4 of Figure 2;

Figure 5 is a view on the order of Figure 4 but illustrating another form of spring connection;

Figure 6 is a fragmentary front elevational view illustrating use of an antisway bar in conjunction with the spring means supporting the frame on the arms;

Figure 7 is a fragmentary plan view of the structure shown by Figure 6;

Figure 8 is a detail view illustrating a spring member constructed according to another form of the invention;

Figure 9 also is a detail view showing another form of spring member which may be used;

Figure 10 is a cross-sectional view taken substantially along line 10—10 of Fig. 8; and, Fig. 11 is a cross-sectional view taken substantially along the line 11—11 of Fig. 9.

Figure 1:
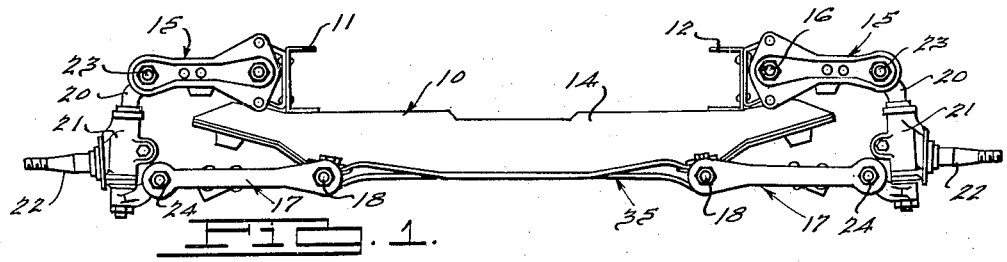
Figure 1 is a front elevational view of a vehicle wheel suspension constructed according to one form of the present invention.
Figure 2:
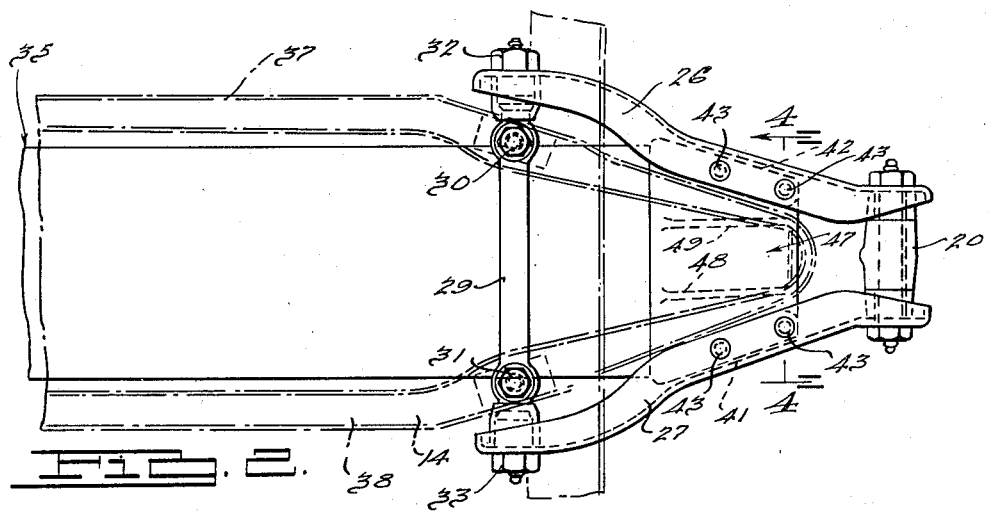
Figure 2 is a fragmentary plan view of the structure shown in Figure 1 with certain upper parts removed for the purposes of clarity.
Figure 3:
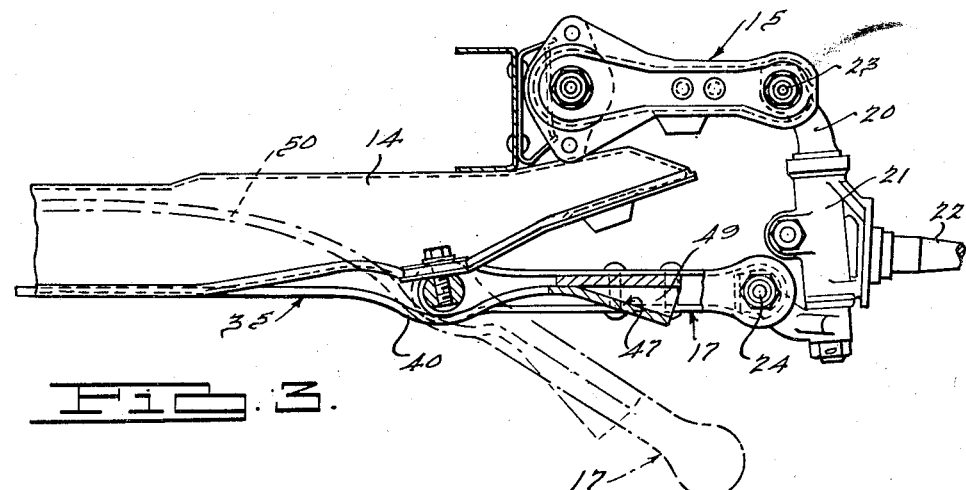
Figure 3 is a fragmentary front elevational view showing the manner in which the spring, frame and opposite arms are assembled.

Referring to Figures 1, 2 and 3, the frame of the vehicle is indicated generally at 10 and is shown as comprising longitudinally extending and spaced side members 11 and 12 and a plurality of cross frame members including a frame member 14. Each of the individual wheel suspensions comprises an upper arm 15 pivoted, as indicated at 16, on the longitudinally extending and adjacent frame member; and a lower arm 17 pivoted, as indicated at 18, to the cross frame member 14 at its under side. At their outer ends the arms 15 and 16 are connected by a vertically extending wheel mounting member 20 which is shown as carrying a swingable sleeve 21 upon which the wheel axle, indicated at 22, is fixed. The wheel mounting member is pivotally connected at its upper and lower ends to the arms 15 and 17, as indicated at 23 and 24, respectively; and it follows that the wheel may rise and fall relative to the frame through pivotal movement of the arms.

Each of the arms 17 at opposite sides of the frame is shown as of wishbone character and comprises side elements 26 and 27 converging towards their outer ends. The pivotal connection 18 may comprise a bar 29 fastened by bolts 30 and 31 to the frame member 14, and opposite ends of the bar 29 have threaded, bearing relation with internally threaded bushings 32 and 33 mounted in the inner ends of the arm elements 26 and 27. As best shown by Fig. 4, each of the arm elements 26 and 27 is of channel shape in cross section, with the two channels opening toward each other.

According to the present invention, instead of using conventional coil springs between the ends of the cross frame member 14 and the lower arms 17 to support the frame on the arms, the frame is supported indirectly on the arms by means of a transversely extending spring element, indicated at 35. This spring element comprises a relatively wide strip of spring steel stock, and with the parts under static load conditions, the spring element is substantially horizontal and the lower arms also are substantially horizontal and in substantially the same plane as that of the strip. In other words, as seen in Figure 1, the strip, arms 17 and pivots 18 are substantially in the same horizontal plane.

Referring particularly to Figure 2, it may be observed that the cross frame member 14 is of inverted channel-shape form and the depending legs thereof are indicated at 37 and 38. The spring strip 35 is narrower than the distance between the legs 37 and 38 of the frame member, and consequently the intermediate portion of the strip can bend or flex upwardly between such legs. Where the spring strip extends under the pivot bars 29, the strip is formed with a curved portion 40 which accommodates the pivot bar and avoids interference therewith. Laterally beyond each pivot bar, the end of the strip is formed with outwardly converging sides 41 and 42 which substantially fit within the channel portions of the arm elements 26 and 27. The ends of the spring element are rigidly fastened to the arm elements by means of rivets or the like 43 extending through the legs of each arm element and the portion of the strip disposed in the channel of the arm element.

With particular reference to Figure 4, a plate 45 extends between the arm elements 26 and 27 in overlapping relation to the spring strip 35 and is disposed at the upper side of the spring element. Spacing strips 46 are provided at the lower side of the strip and within the channels of the arm elements, and all of the parts are rigidly connected together by means of the rivets 43. In order to increase the rigidity of the end portions of the spring element, each end portion is formed with a depression 47 and this depression provides vertically extending reinforcing ribs 48 and 49 which naturally increase the rigidity of the end portions of the strip.

The strip 35 is manufactured in initially curved form, as shown in broken lines 50 in Figure 3, and in assembling it with the arms 17, the frame is elevated sufficiently that the arms may take the broken line positions shown. Then the ends of the spring element are rigidly fastened to the arms 17 in the manner previously indicated, and during this operation the intermediate portion of the spring element is disposed between the legs 37 and 38 of the cross member. After the ends of the spring element are fastened to the arms, the frame is allowed to descend and the character, size and strength of the spring element are such that under normal, static load the spring element will bend until finally it will assume a substantially straight condition with the arms aligned laterally of the frame. From this it follows that the spring element is spring loaded sufficiently to support the vehicle on the arms 17 when the spring element is in its straight condition shown. Any downward movement of the frame relative to either or both arms necessarily acts to increase the loading on the spring element, and consequently the spring element resiliently acts to return the frame to its normal position.

The construction shown by Figure 6 differs from that previously described in that in addition to the spring element 35, an antisway bar 60 is provided which corresponds substantially to the antisway bar shown in the copending application for patent, Serial No. 598,122, previously identified. This antisway bar may be desirable in order to reduce or lessen roll or sway of the frame in a lateral direction but also, as has been specifically pointed out in the copending applications for patent mentioned, it cooperates with the springs mounting the frame on the suspension arms. During normal operation of the vehicle, small movements of the arms with respect to the frame are not appreciably resisted by the antisway bar but if the movements increase sufficiently, the antisway bar cooperates with the regular springing to resist further movement of the arm relative to the frame. The bar 60 is rigidly connected to the arms 17 at opposite sides of the frame and bolts 61 are shown for this purpose.

Figure 8 illustrates a resilient spring element 63 similar to the spring element 35 but is differs therefrom in that the intermediate portion of the strip gradually decreases in thickness to a center point, as indicated by the numeral 64. This structure may be desirable to uniformly stress the spring element to save weight, and to eliminate locally highly stressed portions.

According to Figure 9, instead of using a single spring element such as that shown in the other figures, a multiple leaf spring construction is provided. This structure is shown as including an upper leaf 65 and two progressively shorter strips 66 and 67 at each side of the center of the main spring leaf. Each end of the multiple leaf structure will be fastened to the lower arm 17 substantially in the manner previously described, and generally the arrangement will function in the same manner as the single spring element functions. This construction also may be desirable to uniformly stress the spring element, save weight, and eliminate highly stressed portions.

With respect to the bands shown, it may be observed that where the springs are not highly stressed it may be desirable to use the design of band shown by Figs. 1, 2 and 3. However, where the springs are highly stressed, it may be desirable to design them to obtain substantially uniform stress throughout their length as described in connection with Figs. 8 and 9.

Figure 5 shows a variation in the construction of the arm elements 26 and 27 so as to avoid using the spacing strips 46. In this case the channel elements indicated at 68 and 69 are reduced in cross-sectional dimensions, and it may be feasible also to so reduce these dimensions as even to eliminate the plate 45.

Although only one form of the invention has been illustrated and described in detail, it will be apparent to those skilled in the art that various modifications may be made without departing from the scope of the claims.

What is claimed is:

1. In combination, a vehicle frame, substantially aligned arms projecting laterally from the frame at opposite sides thereof and carrying wheels at their outer ends, means pivotally connecting the inner ends of the arms to the frame so that they can swing vertically relative to the frame, and a resiliently bendable spring strip extending laterally of the frame and having its ends connected substantially rigidly to the arms respectively but being free from any connection to the frame, said strip having sufficient resistance to bending and, therefore, resistance to pivotal movement of the arms upwardly relative to the frame so as to provide substantially the entire springing means supporting the frame on said arms.

2. In combination, a vehicle frame, substantially aligned arms projecting laterally from the frame at opposite sides thereof and carrying wheels at their outer ends, means pivotally connecting the inner ends of the arms to the frame so that they can swing vertically relative to the frame, and a resiliently bendable spring strip extending laterally of the frame and having its ends connected substantially rigidly to the arms respectively but being free from any connection to the frame, said strip having sufficient resistance to bending and, therefore, resistance to pivotal movement of the arms upwardly relative to the frame so as to provide a major portion of the springing means supporting the frame on said arms.

3. In combination, a vehicle frame, arms projecting laterally from the frame at opposite sides thereof and carrying wheels at their outer ends, means pivotally connecting the inner ends of the arms to the frame so that they can swing vertically relative to the frame, a resiliently bendable strip extending laterally of the frame and having its ends connected substantially rigidly to the arms respectively, and a second resiliently bendable strip extending laterally of the frame and having its ends also substantially rigidly connected to the arms but being free from any connection with the frame, one of said strips having sufficient spring resistance to bending upon upward movement of the wheels relative to the frame as to provide substantially the entire springing means supporting the frame on said arms.

4. In combination, a vehicle frame, arms projecting laterally from the frame at opposite sides thereof and carrying wheels at their outer ends, means pivotally connecting the inner ends of the arms to the frame so that they can swing vertically relative to the frame, a resiliently bendable strip extending laterally of the frame and having its ends connected substantially rigidly to the arms respectively, and a second resiliently bendable strip extending laterally of the frame and having its ends also substantially rigidly connected to the arms but being free from any connection with the frame, one of said strips being bent from a non-loaded to a loaded condition under normal static loading of the vehicle while the other strip simultaneously is substantially non-loaded.

5. In combination, a vehicle frame, arms projecting laterally from the frame at opposite sides thereof and carrying wheels at their outer ends, means pivotally connecting the inner ends of the arms to the frame so that they can swing vertically relative to the frame, a resiliently bendable strip extending laterally of the frame and having its ends connected substantially rigidly to the arms respectively but being free from any connection with the frame, and a second resiliently bendable strip extending laterally of the frame and having its ends also substantially rigidly connected to the arms but being free from any connection with the frame, both of said strips being substantially and horizontally straight laterally of the vehicle when the vehicle is under static, normal load with one being bent from a normally curved condition so that it is loaded when bent to the substantially straight condition.

6. In combination, a vehicle frame, substantially aligned arms projecting laterally and oppositely from the frame and carrying wheels at their outer ends, means pivotally connecting the inner ends of the arms to the frame so that they can swing vertically relative to the frame, and a resiliently bendable strip extending laterally of the frame and having its ends connected substantially rigidly to the arms respectively, but being free from any connection to the frame, said strip under normal loading of the vehicle being bent from a normally curved condition to a substantially straight condition laterally of the vehicle.

7. In combination, a vehicle frame, substantially aligned arms projecting laterally and oppositely from the frame and carrying wheels at their outer ends, means pivotally connecting the inner ends of the arms to the frame so that they can swing vertically relative to the frame, a resiliently bendable strip extending laterally of the frame and having its ends connected substantially rigidly to the arms respectively, but being free from any connection to the frame, said strip under normal loading of the vehicle being bent from a normally curved condition to a substantially straight condition laterally of the vehicle, and its resistance to further bending providing substantially the entire spring means supporting the frame on said arms.

8. In combination, a vehicle frame, substantially aligned arms projecting laterally and oppositely from the frame and carrying wheels at their outer ends, means pivotally connecting the inner ends of the arms to the frame so that they can swing vertically relative to the frame, and a resiliently bendable strip connected substantially rigidly to the arms respectively, said strip extending laterally between the arms and beneath said pivotal connecting means.

9. In combination, a vehicle frame, wishbone type arms, each having side elements projecting laterally from the frame in converging relation and carrying wheels at their outer ends, means pivotally connecting the inner ends of the arms to the frame for swinging movement in a vertical direction, and spring means supporting the frame on the arms and comprising a resilient spring metal band extending laterally of the vehicle frame and having its end portions disposed between the side elements of the arms and secured rigidly thereto so that the end portions operate as fixed parts of the arms and move therewith.

10. In combination, a vehicle frame, wishbone type arms on opposite sides of the frame, each arm having side elements projecting laterally from the frame in converging relation and carrying wheels at their outer ends, means pivotally connecting the inner ends of the arms to the frame for swinging movement in a vertical direction, and spring means supporting the frame on the arms and comprising a resilient spring metal band extending laterally of the vehicle frame and having each of its end portions secured to one of said arms at a point spaced from such pivotal connecting means, said band being free from any connection with any object other than said arms and being connected to said arms only at points spaced from the pivotal connecting means for the arms.

JOHN W. LEIGHTON.

REFERENCES CITED

The following references are of record in the file of this patent:

UNITED STATES PATENTS

| Number | Name | Date |
|---|---|---|
| 475,304 | Faske | May 24, 1892 |
| 1,130,157 | Elling | Mar. 2, 1915 |
| 1,334,700 | Hill | Mar. 23, 1920 |
| 1,742,387 | Gatter | Jan. 7, 1932 |
| 2,024,362 | Hoppes | Dec. 17, 1935 |
| 2,038,597 | Peo | Apr. 28, 1936 |
| 2,254,261 | Best | Sept. 2, 1941 |

FOREIGN PATENTS

| Number | Country | Date |
|---|---|---|
| 113,345 | Great Britain | Feb. 21, 1918 |
| 147,275 | Great Britain | July 16, 1920 |
| 329,480 | Germany | Nov. 26, 1920 |
| 710,953 | France | June 16, 1931 |
| 733,617 | France | July 12, 1932 |